United States Patent
Kakimoto et al.

(10) Patent No.: US 6,398,200 B1
(45) Date of Patent: Jun. 4, 2002

(54) VIBRATION ISOLATION MOUNT

(75) Inventors: Toshihiro Kakimoto; Yasukuni Wakita; Seiya Takeshita; Michihiro Kawada, all of Osaka; Tetsuji Sano, Aichi; Yoshihisa Kato; Masao Tajima, Aichi; Kazuhiro Horikoshi, Aichi; Hideyuki Kobayashi, Aichi, all of (JP)

(73) Assignees: Toyo Tire & Rubber Co., Ltd., Osaka; Toyoda Iron Works Co., Ltd., Aichi, both of (JP)

( * ) Notice: Subject to any disclaimer, the term of this patent is extended or adjusted under 35 U.S.C. 154(b) by 0 days.

(21) Appl. No.: 09/297,501

(22) PCT Filed: Sep. 11, 1998

(86) PCT No.: PCT/JP98/04129

§ 371 (c)(1),
(2), (4) Date: Jun. 11, 1999

(87) PCT Pub. No.: WO99/15809

PCT Pub. Date: Apr. 1, 1999

(30) Foreign Application Priority Data

Sep. 19, 1997 (JP) ............................................... 9-273511
Aug. 27, 1998 (JP) ........................................... 10-241267

(51) Int. Cl.[7] .................................................. F16F 13/00
(52) U.S. Cl. ................................ 267/140.12; 267/141.7
(58) Field of Search ....................... 267/140.12, 140.11, 267/140.13, 141.2, 141.3, 141.4, 141.5, 141.7, 282

(56) References Cited

U.S. PATENT DOCUMENTS

| 5,087,021 A | * | 2/1992 | Tanahashi et al. ...... 268/140.11 |
| 5,088,701 A | * | 2/1992 | Nanno .................... 267/140.11 |
| 5,251,884 A | * | 10/1993 | Bouhier .................. 267/140.12 |
| 5,613,668 A | * | 3/1997 | Brunerye .................... 267/219 |
| 5,975,509 A | * | 11/1999 | Miyamoto ............. 267/140.12 |

FOREIGN PATENT DOCUMENTS

| GB | 2033533 | 5/1980 |
| JP | 58-124306 | 8/1983 |
| JP | 8-128483 | 5/1996 |
| JP | 8-268020 | 10/1996 |
| JP | 8-270698 | 10/1996 |
| JP | 9-280314 | 10/1997 |

* cited by examiner

Primary Examiner—Pam Rodriguez
(74) Attorney, Agent, or Firm—Jordan and Hamburg LLP

(57) ABSTRACT

In a vibration isolating mount having a toe correcting mechanism (5) and installed with bored portions (21) and an axial stopper (6) in a rubber-like elastic body (4) between an inner and an outer cylinder (2) and (3), as the stopper (6), a portion of the outer cylinder on a side opposed to the toe correcting mechanism (5) interposing the inner cylinder (2) is extended in the axial direction and stopper rubber (4c) is arranged at a front end of the extended portion (13) by which a rubber vulcanizing mold can be divided in an upper and a lower portion thereof even with the bored portion (21), simplification of mold structure is achieved and light-weighted formation and durability of the mount are promoted.

13 Claims, 6 Drawing Sheets

VIBRATION ISOLATION MOUNT

BACKGROUND OF THE INVENTION

The present invention relates to a vibration isolating mount having a toe correcting mechanism used in suspension or the like of a vehicle.

Conventionally, a vibration isolating mount having a toe correcting mechanism of this kind has been used in, for example, a rear suspension of an automobile. FIG. 8 is a plane view showing a rear suspension of an automobile in which both left and right side of suspension arms 100 are connected to a torsion beam 101, wheels 104 are attached to outer end sides of wheel shafts 103 and vibration isolating mounts 105, attached to connection cylinders at front ends of the arms 100, are connected to vehicle side brackets 106 by bolts and nuts.

FIG. 9 shows a sectional view of the conventional vibration isolating mount 105. The left or right vibration isolating mount 105 is provided with a shaft member, such as an inner cylinder 108, through a center hole 108a of which a bolt is penetrated, an outer cylinder 109, a rubber-like elastic body 110 interposed between the inner cylinder 108 and the outer cylinder 109, and a toe correcting mechanism 111 formed at one end portion of the vibration isolating mount 105.

According to the toe correcting mechanism 111, an inclined plate 112 is welded to one outer side of one end portion of the inner cylinder 108, a taper portion 113 is formed to expand at an end portion of the outer cylinder 109 opposite to the inclined plate 112 and a rubber-like elastic body 110a is interposed between the taper portion 113 and the inclined plate 112, by which thrust force which is force in the axial direction (length direction of inner cylinder) inputted from the suspension arm 100 by cornering force or the like, is dispersed in the direction orthogonal to the axial direction and operates a moment for leading the suspension arm 100 to the toe-in side.

In order to achieve compliance steering by the toe correcting mechanism 111 a spring constant of the rubber-like elastic body 110 must be restrained low, however, by setting the low spring constant, displacement of the rubber-like elastic body 110 in the axial direction is increased and durability of rubber is deteriorated. Therefore, in order to promote the durability of rubber by restraining the displacement of the rubber-like elastic body 110, the vibration isolating mount 105 is installed with a stopper 115 for restraining the displacement of the outer cylinder 109 in the axial direction to a predetermined amount against input of thrust in the axial direction.

The stopper 115 is constituted by a stopper metal piece 117 in a plate-like shape which is welded to an end portion of the inner cylinder 108, a reinforcement metal piece 118 which is welded to the inner cylinder 108 in parallel therewith. A stopper rubber 119 covers the stopper metal piece 117 and the reinforcement metal piece 118. A predetermined amount of a gap 122 is maintained between the stopper rubber 119 and an end flange 121 of the outer cylinder 109.

Further, there is adopted a constitution in the rubber-like elastic body 110 in which bored portions 120 at least one end of each of which are opened and which are holes or gaps extending in the axial direction are formed at a plurality of locations of the surrounding of the inner cylinder 108, by which spring constant in a direction orthogonal to the axial direction is lowered and ride quality is promoted.

Such a conventional vibration isolating mount 105 has difficulties such as the cost is high, a structure of a rubber vulcanizing mold is complicated and product weight is heavy. That is, according to the conventional vibration isolating mount 105, in order to promote durability of the rubber-like elastic body 110 having the low spring constant for achieving compliance characteristic, the stopper 115 is installed at end portion of the inner cylinder 108 with a gap 122 between the stopper 115 and the end portion 121 of the outer cylinder 109 and, the bored portions 120 are formed in the rubber-like elastic body 110 in the axial direction to lower the spring constant of the vehicle in the forward and rearward direction (direction orthogonal to axial direction) and to promote ride quality.

A direction of opening the gap 122 and a direction of opening the bored portion 120 are different from each other. Thus, a core die for forming the bored portions and a core die for forming the gap of the stopper are needed in the rubber vulcanizing mold in fabricating the vibration isolating mount since directions of drawing the core dies after molding are different from each other. Accordingly, there are difficulties in which fabrication of a product is complicated and the cost is high.

Furthermore, when the bored portion 120 are formed deeply to make the spring constant in the axial direction as uniform as possible, a thin film 123 is formed between a bottom portion 120a of the bored portion 120 and the gap 122 of the stopper 115. According to the thin film structure, when load resulting in large displacement is applied, the thin film 123 is often broken a constitutes a start point of crack, rupture and crack is propagated to a main body side of the rubber-like elastic body 110 to thereby cause deterioration in the durability of the vibration isolating mount 105.

Further, strength is needed in the stopper metal piece 117 against input of large load in the left and right direction (axial direction) of the vehicle. The reinforcement metal piece 118 needs to be installed separately from the stopper metal piece 117 or a plate thickness of the stopper metal piece 117 needs to increase, thereby causing a difficulty in which the weight of the vibration isolating mount is increased. Further, the stopper metal piece 117 and the reinforcement metal piece 118 must be welded to the outer peripheral face of the inner cylinder 108 and accordingly, the fabrication cost is increased.

SUMMARY

Hence, it is a first object of the present invention to provide a vibration isolating mount achieving light-weighted formation by abolishing a stopper metal piece and a reinforcement metal piece on a side of an inner cylinder by changing a shape of an outer cylinder, achieving reduction in fabrication cost by simplifying structure of a mold die in vulcanizing rubber and which is excellent in durability.

In the meantime, according to the vibration isolating mount having the toe correcting mechanism mentioned above, in order to apply preliminary compression on the rubber-like elastic body 110 interposed between the inner cylinder 108 and the outer cylinder 109, as shown by FIG. 10, diameter reducing process is carried out on the outer cylinder 109. In that case, the preliminary compression is difficult to apply, to the rubber-like elastic body 110a interposed between the inclined plate 112 and the taper portion 113 which are opposed to each other, since the inner cylinder 108 is moved in a direction designated by an arrow mark P by reaction force of rubber when the outer cylinder 109 is compressed in the radius direction. Tensile force is exerted on an outer peripheral portion 110b of the rubber-like elastic body 110 by moving the inner cylinder 108 and distortion caused by the tensile force deteriorates durability of the rubber-like elastic body 110. Meanwhile, according to such a conventional vibration isolating mount, as shown by FIG. 10, a restraining member 125 for restraining displacement of the inner cylinder 108 in a direction orthogonal to the axial direction may be attached press-fit to the inner cylinder 108.

Hence, it is a second object of the present invention to alleviate distortion of a rubber-like elastic body at diameter reducing process by utilizing a restraining member for restraining displacement of an inner cylinder and finding a novel constitution at its surrounding portion to thereby fabricate a vibration isolating mount having the restraining member at a low cost.

According to a first embodiment of the present invention resolving the above-described first problem, there is provided a vibration isolating mount comprising a shaft member, an outer cylinder arranged at a surrounding of the shaft member and a rubber-like elastic body interposed between the shaft member and the outer cylinder, and having a toe correcting mechanism comprising an inclined face fixed at an outer side portion of an end portion of the shaft member, a taper portion formed at an end portion of the outer cylinder opposed to the inclined face and toe correcting rubber portion interposed between the taper portion and the inclined face, and having a stopper for restraining a displacement of the rubber-like elastic body in an axial direction, wherein a portion of the outer cylinder on a side opposed to the toe correcting mechanism interposing the shaft member is extended in the axial direction of the shaft member to form an extended portion and a stopper rubber portion of the stopper is arranged at a front end of the extended portion.

According to the above-described embodiment, in displacing the outer cylinder in the axial direction, the stopper rubber portion arranged at the front end of the extended portion is brought into press contact with a vehicle side bracket by which the displacement of the outer cylinder in the axial direction is further restrained.

In this way, by adopting an embodiment in which a portion of the outer cylinder on a side opposed to the toe correcting mechanism interposing the shaft member is extended in the axial direction and the stopper rubber is arranged at the front end of the extended portion to provide the side of the outer cylinder with stopper function restraining the displacement of the outer cylinder in the axial direction in a predetermined amount, the gap between the stopper and the outer cylinder in the conventional case is dispensed with and a core mold for forming the gap is dispensed with. Therefore, even when bored portions are provided in the rubber-like elastic body, the vibration isolating mount can be fabricated only by attaching a core mold for forming the bored portions at either die of a metal mold of a type divided into upper and lower dies and dividing the metal mold into the upper and lower dies after vulcanizing and molding rubber. Further, a thin film is not constituted between the bored portion and the gap of the stopper as in the conventional case and durability of the rubber-like elastic body is also promoted. Further, the stopper metal piece and the reinforcement metal piece can be abolished and light-weight formation of the vibration isolating mount can be achieved. Further, this is a measure only extending a portion of the outer cylinder and accordingly, a number of parts is small and reduction in the fabrication cost is feasible.

According to the vibration isolating mount having the above-described embodiment, it is preferable that both ends of the outer cylinder are arranged to a vehicle side bracket fixedly connected with both ends of the shaft member with gaps in the axial direction and a distance between an end of the outer cylinder on the side of the stopper and the vehicle side bracket opposed thereto is set to be equal to or shorter than a distance between an end of the outer cylinder on a side opposed to the stopper and the vehicle side bracket opposed thereto.

Such vibration isolating mounts are normally arranged in a pair symmetrically in the left and right direction when they are arranged in a vehicle and accordingly, when the outer cylinder is displaced in the axial direction toward the side of the stopper in one of the vibration isolating mounts, at the other of the vibration isolating mounts, the outer cylinder is displaced in the axial direction toward a side opposed to the stopper. Accordingly, by making the distance from the end of the outer cylinder on the side of the stopper to the vehicle side bracket equal to or shorter than the distance from the end of the outer cylinder on the side opposed to the stopper to the vehicle side bracket as mentioned above, when the stopper rubber is compressed by the vehicle side bracket by operating the stopper by the displacement in the axial direction in one of the vibration isolating mounts, at the other of the vibration isolating mounts, the end of the outer cylinder on the side opposed to the stopper can be prevented from being brought into contact with the vehicle side bracket. That is, interference between the end of the outer cylinder on the side opposed to the stopper where rubber is not arranged and the vehicle side bracket is prevented.

Further, by constituting such a dimensional setting, promotion of durability of the rubber-like elastic body can be achieved by prolonging the length of the outer cylinder in the axial direction as long as possible while guaranteeing that the above-described interference is not caused.

According to the above-described constitution, it is preferable to form a flange for the stopper extending in a direction orthogonal to the axial direction at a front end of an extended portion of the outer cylinder and fixing stopper rubber at an outer face thereof. Thereby, the stopper rubber can be fixedly adhered over a wide range and the displacement of the outer cylinder in the axial direction can be dealt with. As an embodiment, a flange for a stopper which is formed in a shape of a fan centering on the axis center of the shaft member so that the stopper rubber can be fixedly adhered over a wide range.

Further, as a measure for achieving further light-weight formation of the vibration isolating mount, in place of the inclined plate welded to the shaft member, an embodiment in which a projected portion made of resin having an inclined face is integrally molded to the shaft member can be adopted. In this case, resin is adopted as the material of the projected portion and accordingly, an amount of toe correction can simply be adjusted by changing a shape thereof.

Various materials can be adopted for resin constituting the projected portion and engineering plastic excellent in abrasion resistance, heat resistance and mechanical strength such as nylon, polycarbonate (PC), polyphenylene oxide (PPO), polyoxyethylene (acetal resin POM), polybutyleneterephthalate (PBT) and the like can be adopted. Further, for the projected portion made of resin, special engineering plastic achieving function superior to general engineering plastic such as polyethersulfone (PES), polyetherketone (PEEK), polyphenylene sulfide(PPS), polyimide (PI) and the like can be adopted.

As a shape of the projected portion, any shape can be adopted so far as it has an inclined face opposed to the taper portion of the side of the outer cylinder and does not effect influence on the stopper function of the stopper disposed on the opposed side interposing the shaft member, for example, a projected portion projected from the shaft member in a shape of a lump and having a fan-like shape in view from the axial direction can be adopted. Although a spread angle of the fan shape can pertinently be selected in accordance with the toe correction function, a range of 60° through 150° is preferable and a range of 100° through 120° is more preferable.

Further, it is preferable that the projected portion is formed with a wide width in the axial direction such that it can withstand large load from the axial direction. Specifically, a structure having a shape of a right-angled triangle in respect of a longitudinal sectional shape cut in the axial direction can be exemplified. Although any fixing means can be adopted so far as it can solidly fix the projected portion to the shaft member, when an embodiment in which a fixing portion having a cylindrical shape with a wide width in the axial direction which is integrally formed to the projected portion is fittedly fixed to the shaft member is adopted, even when a large load is applied from the axial direction, sufficient strength can be maintained. Either of adherence, press-fitting and fixing by shrinking of resin at molding can be adopted for fixing the projected portion with the shaft member, and a fixing surface of the shaft member can be uneven.

The inclined face of the projected portion is an inclined face inclined to the axial direction of the shaft member. That is, the inclined face is inclined such that a height of projection of the projected portion is gradually lowered from one side to other side of the shaft member in the axial direction. Further, the taper portion on the side of the outer cylinder opposed to the inclined face is embodied having an inclined face in parallel therewith. An angle of inclination of the inclined face can pertinently be selected in accordance with toe correction function and an angle of 30° through 60° is preferable. Further, the projected portion is made of resin and is integrally molded with the shaft member and accordingly, the step of welding the inclined plate as in the above-described conventional case can be omitted and reduction of fabrication cost is made feasible.

In respect of a relationship between the stopper rubber and the rubber-like elastic body, either of a continuous structure and a separated structure of the stopper rubber and the rubber-like elastic body can be adopted so far as it is an embodiment in which the stopper rubber is arranged at a front end of the extended portion of the outer cylinder and is applicable regardless of presence or absence of the bored portion in the axial direction of the rubber-like elastic body.

In this case, the bored portion is referred to as a hole or an air gap extending in the axial direction, at least one end of which is opened, and in the vibration isolating mount formed with the bored portion, an embodiment in which the bored portion penetrates the rubber-like elastic body in the axial direction can be adopted and accordingly, the spring constant in a direction orthogonal to the axial direction can be designed uniformly in the axial direction. Further, when a structure in which the bored portion penetrates the rubber-like elastic body is adopted, different from the conventional structure in which the thin film is formed between the bottom portion of the bored portion and the gap of the stopper, breakage of the thin film by large load is totally dispensed with and durability of rubber is promoted which is preferable.

Further, the shaft member is not restricted to a cylindrical member such as an inner cylinder but may be a member in a solid state. Further, in respect of the taper portion and the extended portion in the outer cylinder, the outer cylinder member made of a metal can be integrally formed simply by pressing or the like. According to the vibration isolating mount, the projected portion is integrally fixed to the end portion of the shaft member, nonvulcanized rubber-like elastic body is respectively interposed between the shaft member and the outer cylinder and fixed to the toe correction portion and the stopper portion and thereafter, molded by integrally adhering rubber by vulcanizing it in a metal mold and thereafter, durability of the rubber-like elastic body may be promoted by reducing the diameter of the cylindrical portion of the outer cylinder.

According to a second embodiment of the present invention resolving the above-described second problem, there is provided a vibration isolating mount comprising a shaft member, an outer cylinder arranged at a surrounding of the shaft member and a rubber-like elastic body interposed between the shaft member and the outer cylinder, further having a toe correcting mechanism comprising a projected portion integrated to an outer side portion of the shaft member and having an inclined face inclined to an axial direction of the shaft member, a taper portion formed at a portion of the outer cylinder opposite to the inclined face, and a toe correcting rubber portion interposed between the taper portion and the inclined face and continuous to the rubber-like elastic body, wherein a restraining member projected from the shaft member to an outer side for restraining a displacement of the shaft member in a direction orthogonal to the axial direction is integrally formed with the projected portion remotely from the inclined face of the projected portion in the axial direction by a predetermined distance, by a synthetic resin and via a cylindrical portion externally fitted onto the shaft member and the rubber-like elastic body is interposed between the restraining member and the projected portion.

In such an embodiment, when diameter reducing process is carried out on the outer cylinder, force applied on the rubber-like elastic body is received by the inclined face of the projected portion of the shaft member and a face of the restraining member on the side of the projected portion and accordingly, in comparison with the conventional case, the shaft member is difficult to move to the outer side, the preliminary compression is easy to apply on the rubber-like elastic body and the distortion of the outer peripheral portion of the conventional rubber-like elastic body caused by tensile force is significantly reduced by which durability of the vibration isolating mount can significantly be promoted.

Further, by integrally molding the projected portion for the toe correcting mechanism and the restraining member by synthetic resin, the fabrication cost of the both members can be reduced, and the both members which have separately been attached conventionally by welding or press-fitting, can be attached simply at a low cost by a single step of externally fitting them onto the shaft member and by dispensing with positioning between the both members.

DETAILED DESCRIPTION

Figure 8:
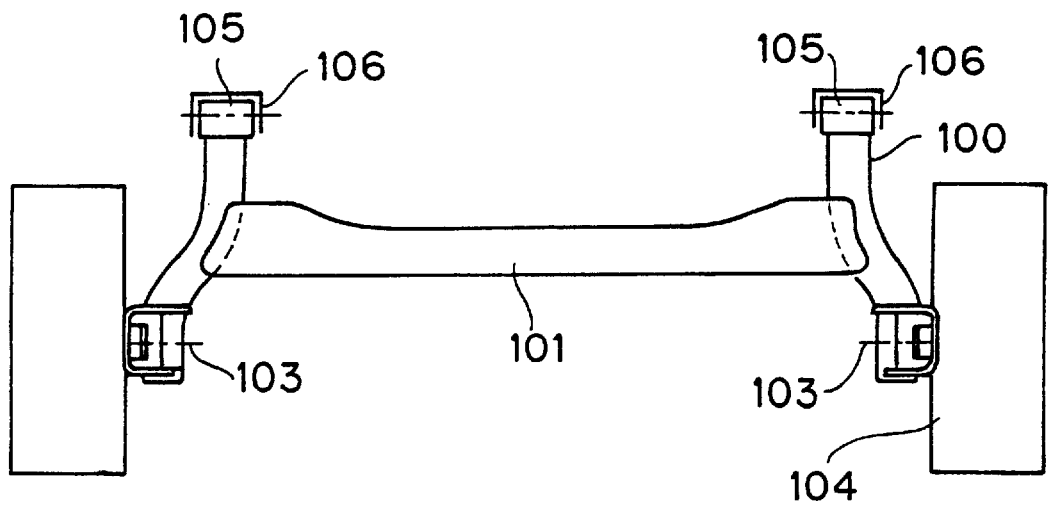
FIG. 8 is a plan view showing a rear suspension mechanism.
Figure 9:
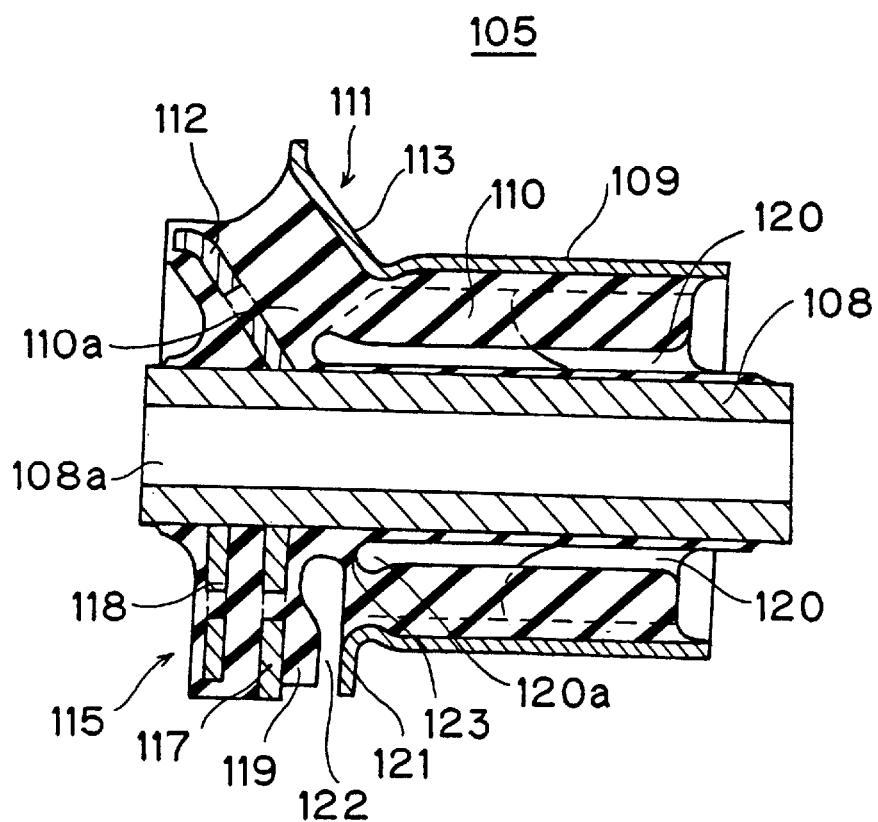
FIG. 9 is a sectional view of a conventional vibration isolating mount.
Figure 10:
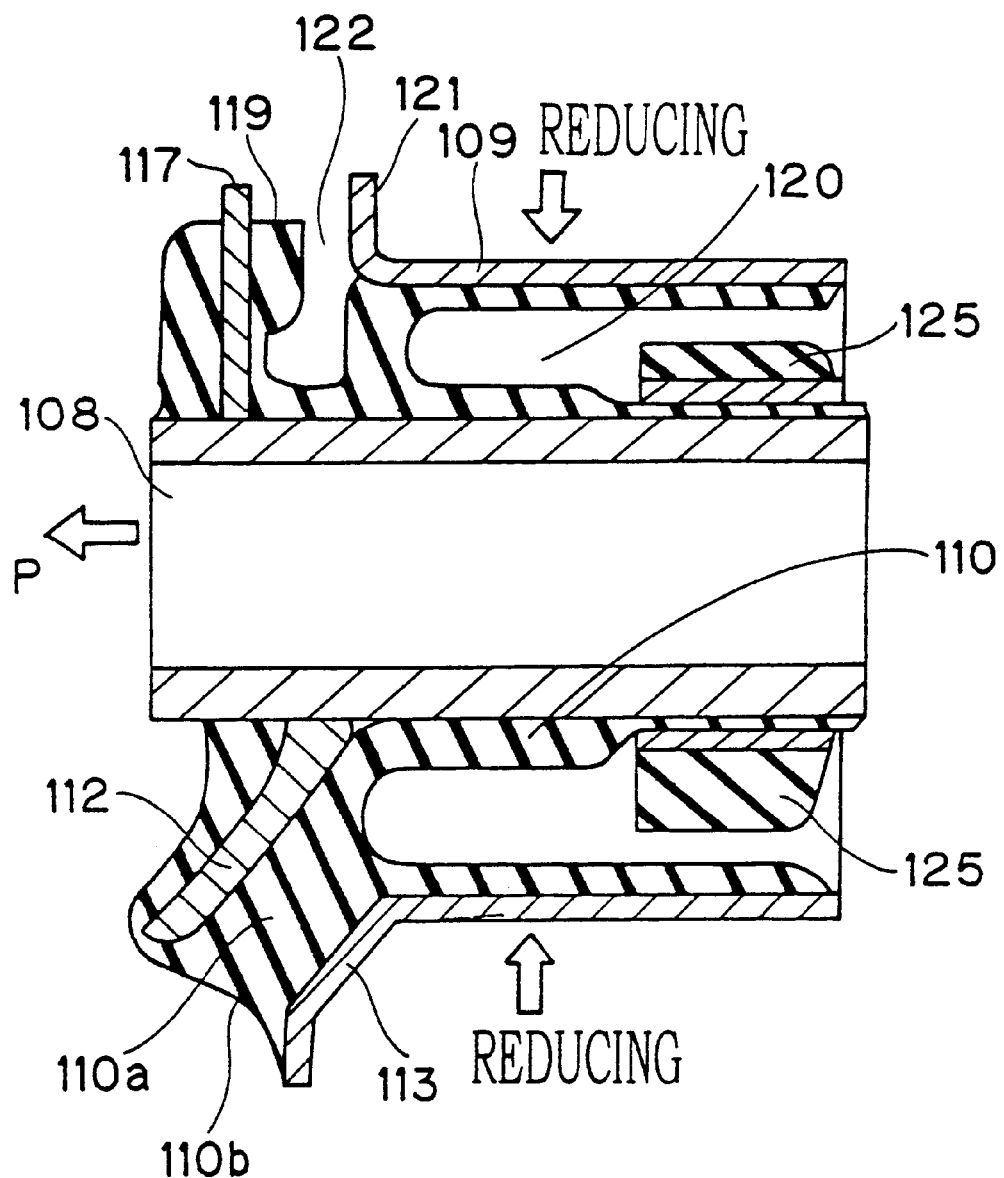
FIG. 10 is a sectional view of other conventional vibration isolating mount.

An explanation will be given of embodiments according to the present invention in reference to the drawings as follows. As shown by FIG. 8, a vibration isolating mount which is used in an embodiment, is used to connect to a connection cylinder at a front end of an arm 100 in a rear suspension mechanism in which the suspension arms 100 at both left and right side of a vehicle are connected to a torsion beam 101.

A vibration isolating mount 1 according to a first embodiment of the present invention is provided with a structure shown by FIG. 1 through FIG. 5. Further, FIG. 2 through FIG. 5 show a state before diameter-reducing a cylinder portion 3a of an outer cylinder 3 of the vibration isolating mount 1.

Figure 1:
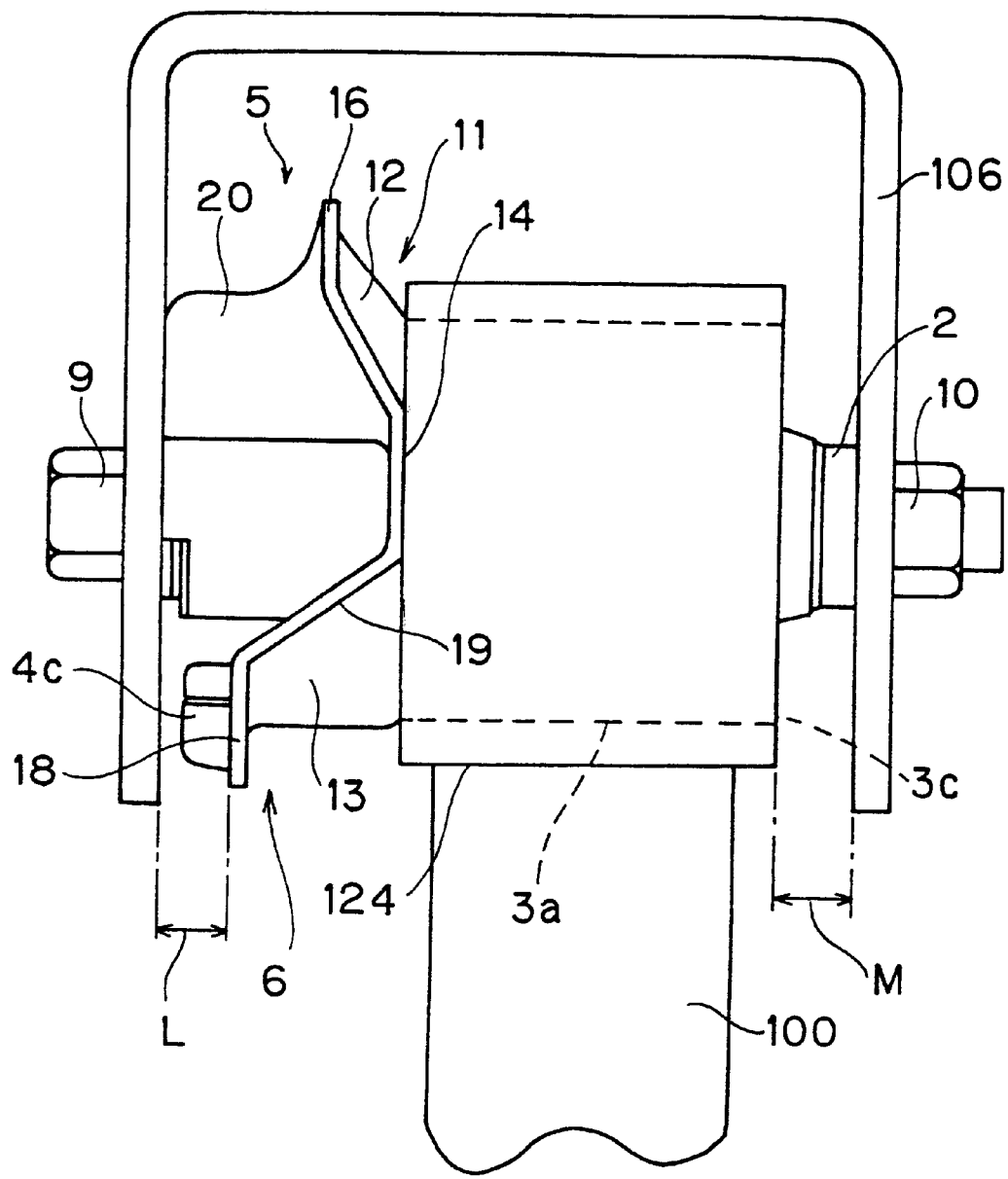
FIG. 1 is a plan view showing a state in which a vehicle side bracket is integrated with a vibration isolating mount according to a first embodiment of the present invention.
Figure 2:
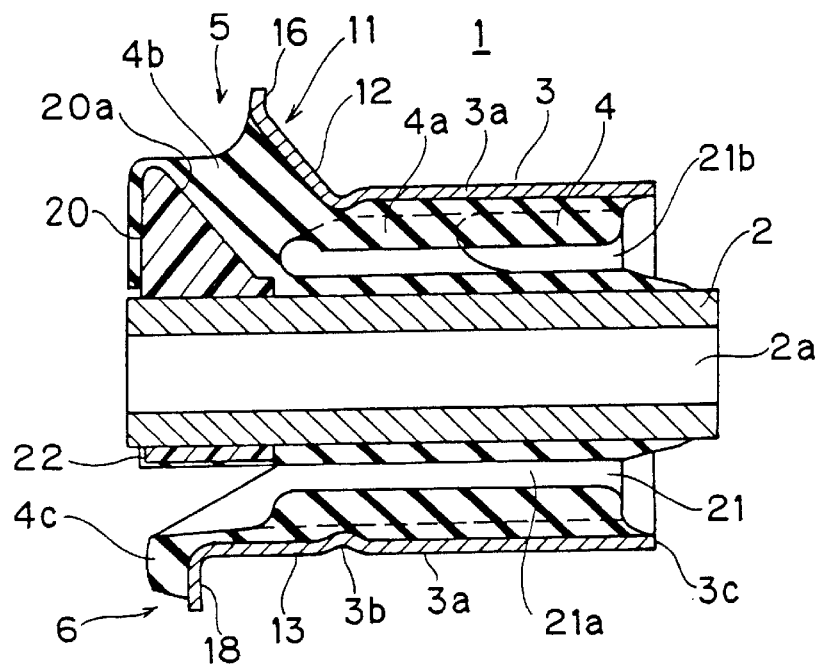
FIG. 2 is a sectional view of the vibration isolating mount.
Figure 3:
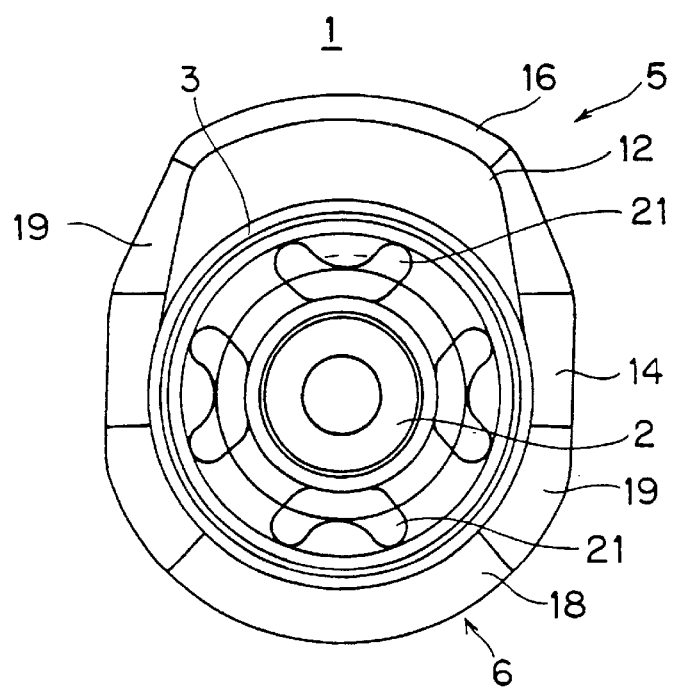
FIG. 3 is a right side view of the vibration isolating mount.
Figure 4:
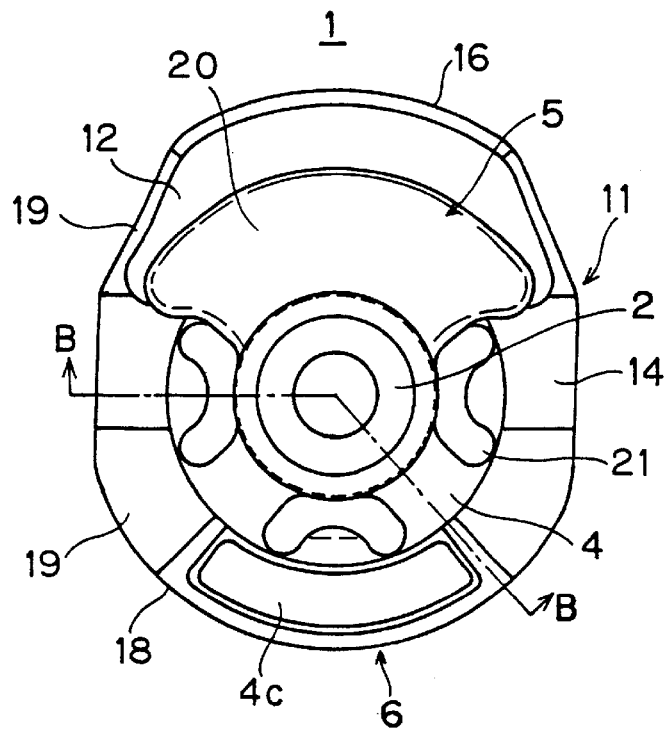
FIG. 4 is a left side view of the vibration isolating mount.
Figure 5:
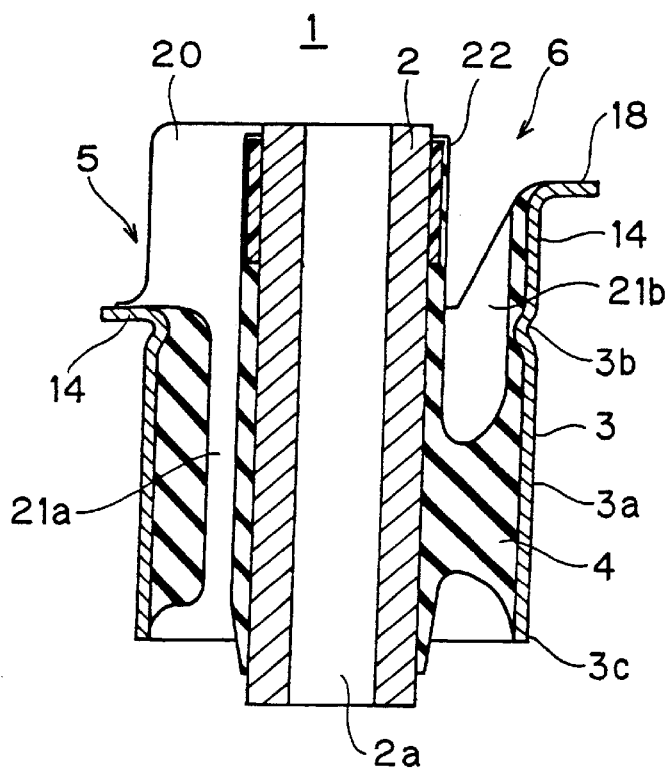
FIG. 5 is a sectional view taken along a line B—B of FIG. 4.

FIG. 1 and FIG. 2 show the vibration isolating mount connected to the suspension arm 100 on the right side of the vehicle in FIG. 8.

As illustrated, a basic embodiment of the vibration isolating mount 1 is provided with an inner cylinder 2 as a shaft member, the outer cylinder 3 arranged surrounding a rubber-like elastic body 4 interposed between the inner cylinder 2 and the outer cylinder 3 and adheringly vulcanized to connect the both. A toe correcting mechanism 5 is installed at a portion of an outer side end portion of the inner cylinder 2 and a stopper 6 is provided for restraining displacement of the rubber-like elastic body 4 in the axial direction. Two of the vibration isolating mounts 1 are arranged at front ends of the left and right suspension arms 100 symmetrically in left and right direction.

The inner cylinder 2 is formed in a cylindrical shape, a bolt 9 is penetrated through a center hole 2a thereof and as shown by FIG. 1, both ends of the inner cylinder 2 are fixedly connected by a nut 10 to both left and right side walls of a vehicle side bracket 106 having a channel shape.

The outer cylinder 3 has a plate member or a pipe member made of a metal and a cylinder portion 3a in a shape of a straight pipe which is arranged surrounding the inner cylinder 2 in a shape of a concentric circle. An expanded portion 11 is continuous to an outer end side of the cylinder portion 3a in the axial direction via a recess portion 3b for constituting a start point of diameter reducing operation.

The cylinder portion 3a is to be subjected to a reducing operation in a diameter contraction direction with the recess portion 3b as a start point after vulcanizing the vibration isolating mount 1 by which a main body rubber portion 4a of the rubber-like elastic body 4 interposed between the cylinder portion 3a and the inner cylinder 2 is applied with preliminary compression. A connection cylinder 124 of the suspension arm 100 is externally press-fitted onto the outer periphery of the cylinder portion 3a.

The expanded portion 11 has a taper portion 12 of the toe correcting mechanism 5, an extended portion 13 of the stopper 6 and a contact flange portion 14 which is installed therebetween and is brought into contact with an outer end of the connection cylinder 124 of the suspension arm 100 in the axial direction.

The taper portion 12 is formed to expand in a shape of a bugle to the outer side in the axial direction at a portion of the expanded portion 11 and at a front end thereof, a toe correction side flange 16 is formed to be folded in a direction orthogonal to the axial direction and toward the outer side.

The extended portion 13 is formed in a shape of a circular arc having a diameter substantially the same as a diameter of the cylinder portion 3a on a side opposed to the taper portion 12 interposing the inner cylinder 2 and is formed longer than the flange 16 at the front end of the taper portion 12 to the outer side in the axial direction and at a front end thereof. A stopper flange 18 is formed to be folded in a direction orthogonal to the axial direction and toward the outer side.

The contact flange portion 14 is formed to be folded to rise from the recess portion 3b of the cylinder portion 3a in a direction orthogonal to the axial direction and to the outer side between the taper portion 12 and the extended portion 13 and is continuous to the flange 16 of the taper portion 12 and the flange 18 of the extended portion 13 via an inclined flange 19.

The expanded portion 11 is expanded by pressing an end portion of the pipe member of the outer cylinder 3 and the taper portion 12, the extended portion 13 and the respective flanges 14, 16, 18 and 19 can simultaneously be formed.

The spring constant of the rubber-like elastic body 4 is set to be low to improve the compliance characteristic when lateral force such as cornering force or the like and force in the forward and rearward direction are exerted. The rubber-like elastic body 4 is fixed integrally to the inner cylinder 2 and the outer cylinder 3 by vulcanizing and molding thereof and is continuously constituted by the main body rubber portion 4a interposed between the cylinder portion 3a and the inner cylinder 2, a toe correcting rubber portion 4b interposed between the taper portion 12 and a projected portion 20 of the toe correcting mechanism 5 and a stopper rubber portion 4c fixed to the stopper flange 18 of the extended portion 13.

The main body rubber portion 4a is applied with preliminary compression by reducing the outer cylinder 3 after vulcanization and is formed with bored portions 21 at four locations at the surrounding of the inner cylinder 2. The bored portion 21 is formed in a shape of a circular arc a center of which is disposed on the outer side of the outer cylinder 3 in view from the axial direction and the bored portions 21 include bores 21a formed long in the axial direction (length of cylinder portion 3a in the axial direction) at central portions of the bored portions 21 and bores 21b formed short in the axial direction (about ½ of length of cylinder portion 3a in the axial direction) at both sides thereof. The bored portions 21 on the side of the contact flange portion 14 and the extended portion 13 constitute a structure penetrating the main body rubber portion 4a in the axial direction and the bored portion 21, on the side of the toe correcting mechanism 5, constitutes a structure formed up to a middle portion of the toe correcting rubber portion 4b due to the projected portion 20.

The toe correcting mechanism 5 disperses thrust force in a direction orthogonal to the axial direction which is a force in the axial direction (left and right direction of vehicle) inputted from the suspension arm 100 in respect of cornering force or the like to thereby operate a moment for leading the suspension arm 100 to the toe-in side. The toe correcting mechanism 5 includes the taper portion 12 on the side of the outer cylinder 3, and the projected portion 20 having an inclined face 20a which is fixed to the inner cylinder 2 and is formed to project in a shape of a lump in a direction orthogonal to the axial direction and the toe correcting rubber portion 4b interposed between the taper portion 12 and the inclined face 20a.

The projected portion 20 is constituted by synthetic resin, such as nylon resin or the like, and preferably, an engineering plastic and is formed in a shape of a right-angled triangle in respect of a longitudinal sectional shape in the axial direction and is integrally formed with a fixing portion 22 in a cylindrical shape having a wide width (for example, 20 mm) in the axial direction which is fittedly adhered to the outer periphery of the inner cylinder 2 such that the projected portion 20 can withstand large load from the axial direction.

The projected portion 20 is formed only on one side of the mount centering on one radius direction of the inner cylinder 2. That is, the projected portion 20 is provided with the inclined face 20a opposed to the taper portion 12 of the outer cylinder 3 and is provided with a shape of a fan spreading over by an angle of substantially 100° through 120° in view from the axial direction. Further, the inclined face 20a of the projected portion 20 is an inclined face lowering from the outer side to the inner side of the inner cylinder 2 in the axial direction and the taper portion 12 of the outer cylinder 3 opposed to the inclined face 20a is constituted by an inclined face in parallel therewith (angle of inclination; 45°). The angle of inclined face 20a and the angle of the taper portion 12 are set in accordance with toe correction function.

The toe correcting rubber portion 4b covers not only between the taper portion 12 and the inclined face 20a of the projected portion 20 but also the projected portion 20 and the fixing portion 22 and therefore, rubber of the toe correcting rubber portion 4b is brought into contact with the vehicle side bracket 106. But the rubber may be apart from the bracket 106. But the rubber may be apart from bracket 106.

The stopper 6 includes the extended portion 13 of the outer cylinder 3 and the stopper rubber portion 4c fixedly adhered to the outer side face of the stopper flange 18 in the axial direction.

The length of the extended portion 13 of the outer cylinder 3 is set to a length allowing displacement of the outer cylinder 3 in the axial direction. That is, as shown by FIG. 1, a predetermined interval L is provided between the stopper flange 18 at the front end of the extended portion 13 and a left side wall of the vehicle side bracket 106, further, a predetermined interval M is provided between an end 3c of the outer cylinder 3 and a right side wall of the vehicle side bracket 106 and the interval L on the side of the stopper 6 is set to be equal to or smaller than the interval M on the side opposed to the stopper. For example, when the interval M on the side opposed to the stopper is set to 10 mm, the interval L on the side of the stopper is set to be equal to or smaller than 10 mm, preferably, 9 mm and the stopper rubber 4c of about 2 through 8 mm may be fixedly adhered to a flange face on the outer side of the stopper flange 18.

By such a dimensional setting, for example, in the vibration isolating mount 1 on the right side of the vehicle shown by FIG. 1, when the outer cylinder 3 is displaced in the axial direction toward the inner side of the vehicle and the displacement is restrained by the stopper 6, in the vibration isolating mount on the left side of the vehicle, although an end of the outer cylinder on a side opposed to the stopper which is not covered by rubber, is displaced in the axial direction to approach the vehicle side bracket, the end of the outer cylinder on the side opposed to the stopper is not brought into contact with the vehicle side bracket 106. That is, interference between the end of the outer cylinder 3 on the side opposed to the stopper and the vehicle side bracket 106 is prevented.

Accordingly, promotion of durability by increasing the volume of the rubber-like elastic body 4 is achieved by prolonging the length of the outer cylinder 3 in the axial direction as long as possible under such a dimensional restriction. Further, by increasing the volume of the rubber-like elastic body 4, hardness of rubber can be reduced and accordingly, the ride quality can also be promoted by reducing the dynamic spring constant.

Further, the stopper flange 18 is formed in a shape of a fan centering on the axis center of the inner cylinder 2 and the stopper rubber 4c is fixedly adhered thereto such that it is the highest at the central portion of the flange face and is lowered toward both end sides.

In fabricating the vibration isolating mount 1 having the above-described constitution, nonvulcanized rubber for constituting the rubber-like elastic body 4 is interposed between the outer cylinder 3 formed with the taper portion 12, the extended portion 13 and the flanges 14, 16,18 and 19 by pressing, and the inner cylinder 2 fixedly adhered with the projected portion 20 made of an engineering plastic, the whole entity is inserted into a metal mold of a type of upper and lower (axial direction) divided dies, a core mold for forming the bored portions 21 or the like is installed and vulcanizing molding is carried out thereby integrally molding the inner and outer cylinders 2 and 3 and the rubber-like elastic body 4. As the metal mold structure in this case, in comparison with the above-described conventional technology, the stopper metal piece and the reinforcement metal piece on the side of the inner cylinder are abolished and in place thereof, only a portion of the outer cylinder 3 is extended in the axial direction and accordingly, the metal mold structure can be simplified.

Therefore, also in mold detachment operation after vulcanizing molding, by only dividing the upper and the lower dies, a molded product of the vibration isolating mount having the toe correcting mechanism 5, the bored portions 21 and the stopper 6 can simply be finished. The finished molded product dispenses with stopper metal pieces or the like and the projected portion is molded by resin and accordingly, the product is light-weighted and can be fabricated inexpensively. Further, the cylinder portion 3a of the outer cylinder 3 of the molded product is reduced in the diameter contracting direction by a reducing machine and preliminary compression is applied on the main body rubber portion 4a by which the durability of rubber can be improved. Further, the product can be finished by a system of dividing upper and lower dies and accordingly, a thin film is not formed between the bored portion and the gap on the side of the stopper as in the conventional case and the durability of rubber can be promoted.

Figure 6:
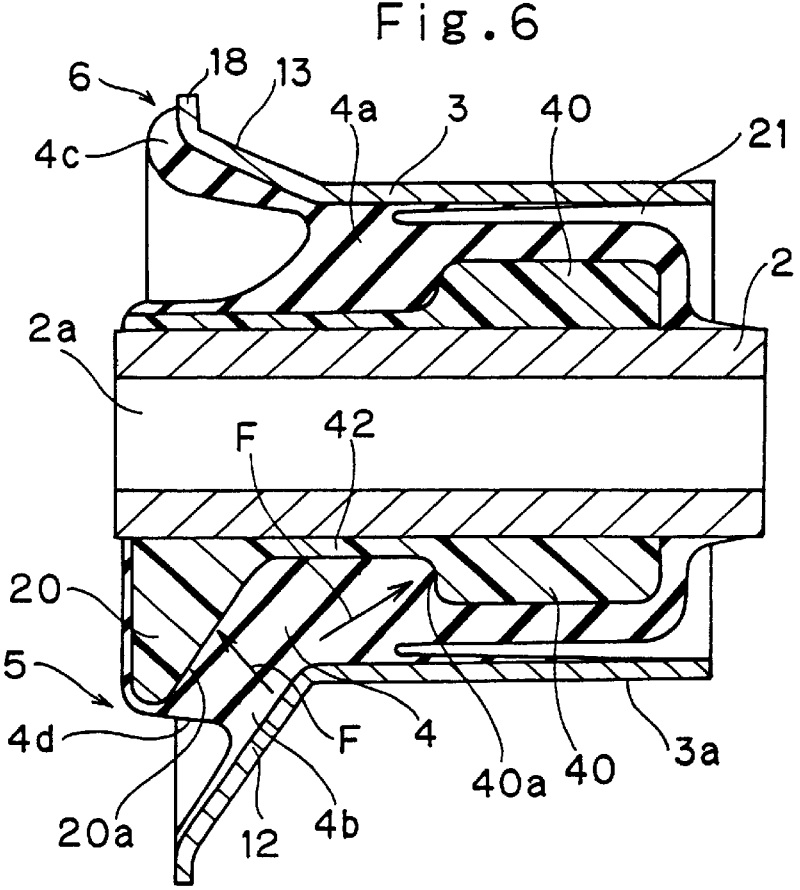
FIG. 6 is a sectional view of a vibration isolating mount according to a second embodiment of the present invention.

FIG. 6 is a sectional view showing a vibration isolating mount according to a second embodiment of the present invention.

Similar to the vibration isolating mount according to the first embodiment, the vibration isolating mount according to the second embodiment is also provided with the basic constitution comprising the inner cylinder 2 as a shaft member, the outer cylinder 3 surrounding the inner cylinder 2, the rubber-like elastic body 4 interposed between the inner cylinder 2 and the outer cylinder 3 for connecting the both, the toe correcting mechanism 5 provided at the outer side end portion of the inner cylinder 3 and the stopper 6 installed at the outer side end portion of the outer cylinder 3 for restraining the displacement of the rubber-like elastic body 4 in the axial direction.

Figure 7:
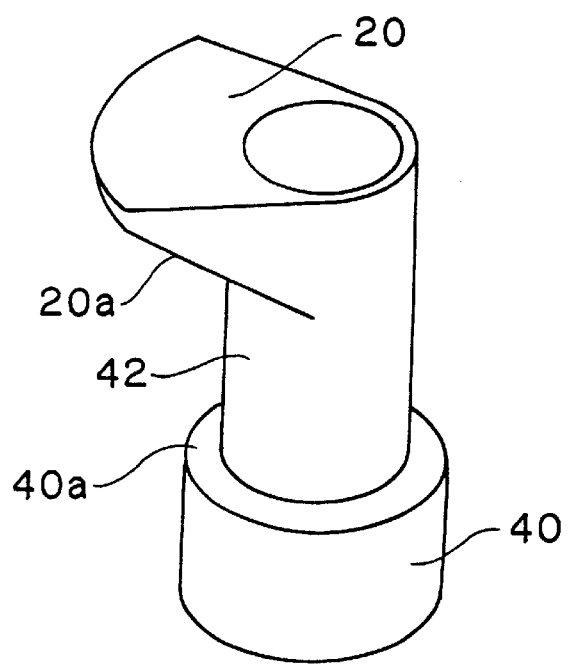
FIG. 7 is a perspective view showing a molded object integrated with a projected portion for toe correction and a restraining member according to the second embodiment.

According to such a basic constitution, in the second embodiment, as shown by FIG. 6 and FIG. 7, there is formed a restraining member 40 projected from the inner cylinder 2 to the outer side for restraining the displacement of the inner cylinder 2 in a direction orthogonal to the axial direction. The restraining member 40 is formed remote from the inclined face 20a of the projected portion 20 of the toe correcting mechanism 5 in the axial direction by a predetermined distance and integrally with the projected portion 20 via a cylindrical portion 42 externally fitted onto the inner cylinder 2 by synthetic resin. Further, an engineering plastic mentioned above can be used for the synthetic resin.

In this case, although as mentioned above, the projected portion 20 is formed only on one side of the mount centering on one radius direction of the inner cylinder 2, the restraining member 40 is formed in a ring-like shape surrounding the total periphery of the inner cylinder 2.

Further, the rubber-like elastic body 4 is interposed between the restraining member 40 and the projected portion 20 in a state of being continuous from the toe correcting rubber portion 4b and by being vulcanized adheringly.

Further, according to the vibration isolating mount of the second embodiment, after adheringly vulcanizing the rubber-like elastic body 4 between the inner and the outer cylinders 2 and 3, reducing operation for contracting the diameter of the outer cylinder 3 is carried out to apply preliminary compression on the rubber-like elastic body 4. In this case, as shown by FIG. 6, force F applied on the rubber-like elastic body 4 is received by the inclined face 20a of the projected portion 20 of the inner cylinder 2 and a face 40a of the restraining member 40 on the side of the projected portion 20. Accordingly, in comparison with the conventional case, the inner cylinder 2 is difficult to move to the outer side, the preliminary compression is easy to apply on the rubber-like elastic body 4 and distortion of an outer peripheral portion 4d of the rubber-like elastic body caused by tensile force is significantly reduced by which the durability of the vibration isolating mount can considerably be promoted.

Further, by integrally molding the projected portion 20 for the toe correcting mechanism 5 and the restraining member 40 by synthetic resin, the fabrication cost of the both members is reduced. Both members 20 and 40, which have conventionally been attached separately by welding or press-fitting, can be attached simply at a low cost by a single step of externally fitting and adhering them to the inner cylinder 2 and by dispensing with positioning between the both members.

Further, although according to the first and the second embodiments, the toe correcting mechanism 5 and the stopper 6 are arranged at the outer side end portion of the mount in the axial direction, they can also be arranged at an inner side end portion of the mount in the axial direction.

With the vibration isolating mount of the first aspect of the invention, by providing the side of the outer cylinder with stopper function restraining the displacement of the outer cylinder in the axial direction in a predetermined amount, a stopper metal piece and a reinforcement metal piece can be abolished and light-weighted formation can be achieved. Further, it is possible to reduce in fabrication cost by simplifying structure of a mold die in vulcanizing rubber. Further, durability is promoted.

With the vibration isolating mount of the second aspect of the invention, by being integrally formed the restraining member for restraining a displacement of the shaft member in a direction orthogonal to the axial direction with the projected portion of the toe correcting mechanism, and by being interposed the rubber-like elastic body between the restraining member and the projected portion, it is possible to alleviate distortion of the rubber-like elastic body at diameter reducing process of the outer cylinder, and therefor durability of the vibration isolating mount can be promoted. Further, by integrally molding the projected portion and the restraining member by synthetic resin, the fabrication cost of the both members can be reduced and the both members can be attached simply to the shaft member.

What is claimed is:

1. A vibration isolating mount comprising:
    a shaft member defining an axis and an axial direction and having a first end with an outer side portion;
    an outer cylinder surrounding the shaft member, the outer cylinder having a front end with an extended front end portion extended in the axial direction from the front end and slanted outwardly with respect to the axis;
    an elastic body interposed between the shaft member and the outer cylinder;
    a toe correcting mechanism installed at the outer side portion of the first end of the shaft member, the toe correcting mechanism being disposed on a side of the axis opposite the extended front end portion of the cylinder; and
    a stopper having elasticity for restraining a displacement of the elastic body in the axial direction, the stopper being disposed on the extended front end portion of the outer cylinder extending axially further than the extended front end to accept compression against the extended front end portion by force in the axial direction.

2. The vibration isolating mount according to claim 1, wherein the elastic body includes at least one bored portion formed at least one of a plurality of portions of the elastic body and the at least one bored portion is on a side of the extended front end portion of the outer cylinder and is formed to penetrate the elastic body.

3. The vibration isolating mount according to claim, 1 wherein the extended front end portion forms a flange and the stopper is fixedly adhered to the flange.

4. The vibration isolating mount according to claim 1, wherein the toe correcting mechanism has:
    a projected portion with an inclined face that is inclined with respect to the shaft member;
    a taper portion formed at an end portion of the outer cylinder opposite to the inclined face; and
    a toe correcting elastic portion interposed between the taper portion and the inclined face and contiguous with the elastic body.

5. The vibration isolating mount according to claim 4, wherein the projected portion is formed of an engineering plastic.

6. The vibration isolating mount according to claim 4, wherein the projected portion is formed of a resin.

7. A vibration isolating mount comprising:
    a shaft member defining an axis and an axial direction and having a first end with an outer side portion, and a second end;
    an outer cylinder surrounding the shaft member, the outer cylinder having a front end, an extended front end portion extended in the axial direction from the front end, and a rear end;

an elastic body interposed between the shaft member and the outer cylinder;

a toe correcting mechanism installed on the outer side portion of the first end of the shaft member, the toe correcting mechanism being disposed on a side of the axis opposite the extended front end portion of the cylinder;

a stopper having elasticity for restraining a displacement of the elastic body in the axial direction, the stopper being disposed on the extended front end portion of the outer cylinder to accept compression in the axial direction;

a vehicle side bracket;

the first and second ends of the shaft member being fixedly connected to the vehicle side bracket; and the extended front end portion and the rear end of the outer cylinder are arranged to define gaps to opposing surfaces of the vehicle side bracket in the axial direction, wherein a distance between the extended front end portion of the outer cylinder on a side of the stopper and the vehicle side bracket opposed thereto is set to be equal to or shorter than a distance between the rear end of the outer cylinder and the vehicle side bracket opposed thereto.

8. A vibration isolating mount, comprising:

a shaft member defining an axis and an axial direction and having a first end with an outer side portion, and a second end;

an outer cylinder surrounding the shaft member, the outer cylinder having a front end, an extended front end portion extended in the axial direction from the front end, and a rear end;

an elastic body interposed between the shaft member and the outer cylinder;

a toe correcting mechanism installed on the outer side portion of the first end of the shaft member, the toe correcting mechanism being disposed on a side of the axis opposite the extended front end portion of the cylinder, the toe correcting mechanism including:
 a projected portion with an inclined face that is inclined with respect to the shaft member;
 a taper portion formed at an end portion of the outer cylinder opposite to the inclined face; and
 a toe correcting elastic portion interposed between the taper portion and the inclined face and contiguous with the elastic body;

a stopper having elasticity for restraining a displacement of the elastic body in the axial direction, the stopper being disposed on the extended front end portion of the outer cylinder to accept compression in the axial direction;

a restraining member projecting radially from the shaft member for restraining radial displacement of the shaft member relative to the outer cylinder;

the restraining member being displaced from the inclined face of the projected portion in the axial direction by a predetermined distance;

a cylindrical member connecting the restraining member to the projected portion, the cylindrical member being fitted onto the shaft member;

the projected portion, the cylindrical member, and the restraining member being integrally formed of a synthetic resin; and the etastic body being interposed between the restraining member and the projected portion.

9. A vibration isolating mount comprising:

a shaft member having an outer side portion and defining an axis extending in an axial direction;

an outer cylinder surrounding the shaft member;

an elastic body interposed between the shaft member and the outer cylinder; and a toe correcting mechanism having:
 a projected portion on the outer side portion of the shaft member,
 the projected portion having an inclined face inclined with respect to the axis of the shaft member,
 a taper portion formed at a portion of the outer cylinder opposite to the inclined face, and
 a toe correcting elastic portion interposed between the taper portion and the inclined face and which is contiguous with the elastic body;

a restraining member projecting radially from the shaft member for restraining a displacement of the shaft member in a direction orthogonal to the axial direction;

a cylindrical portion connecting the restraining member to the projected portion;

the projected portion, the cylindrical portion and the restraining member being integrally formed of a resin;

the restraining member being displaced from the inclined face of the projected portion in the axial direction by a predetermined distance, the cylindrical portion being fitted onto the shaft member; and the elastic body being interposed between the restraining member and the projected portion.

10. A vibration isolating mount comprising:

a shaft member having an axis and an outer side portion;

an outer cylinder having a front end with an extended front end portion and a rear end surrounding the shaft member;

an elastic body interposed between the shaft member and the outer cylinder;

a toe correcting mechanism installed at the outer side portion of an end portion of the shaft;

a stopper having an elastic portion for restraining a displacement of the elastic body in an axial direction;

the extended front end portion being an extended portion of the outer cylinder on a side opposed to the toe correcting mechanism;

said extended front end portion having a front end extending substantially orthogonal to the axis of the shaft; and the elastic portion of the stopper being arranged on the front end of the extended front end portion for cushioning movement in the axial direction.

11. The vibration isolating mount according to claim 10, wherein the extended front end portion is orthogonal to the axis of the shaft.

12. The vibration isolating mount according to claim 10, wherein the elastic body includes at least one bored portion formed in at least one portion of the elastic body and the at least one bored portion is on a side of the extended front end portion of the outer cylinder and is formed to penetrate the elastic body.

13. The vibration isolating mount according to claim 10, wherein the toe correcting mechanism has:
 a projected portion with an inclined face that is inclined with respect to the shaft member;
 a taper portion formed at an end portion of the outer cylinder opposite to the inclined face; and
 a toe correcting elastic portion interposed between the taper portion and the inclined face and contiguous with the elastic body.

\* \* \* \* \*